(12) United States Patent
Ogihara

(10) Patent No.: US 11,551,878 B2
(45) Date of Patent: Jan. 10, 2023

(54) ELECTRICITY STORAGE DEVICE

(71) Applicant: KABUSHIKI KAISHA TOYOTA CHUO KENKYUSHO, Nagakute (JP)

(72) Inventor: Nobuhiro Ogihara, Nagakute (JP)

(73) Assignee: KABUSHIKI KAISHA TOYOTA CHUO KENKYUSHO, Nagakute (JP)

(*) Notice: Subject to any disclaimer, the term of this patent is extended or adjusted under 35 U.S.C. 154(b) by 150 days.

(21) Appl. No.: 15/574,022

(22) PCT Filed: Jun. 14, 2016

(86) PCT No.: PCT/JP2016/067614
§ 371 (c)(1),
(2) Date: Nov. 14, 2017

(87) PCT Pub. No.: WO2017/006713
PCT Pub. Date: Jan. 12, 2017

(65) Prior Publication Data
US 2018/0301290 A1     Oct. 18, 2018

(30) Foreign Application Priority Data

Jul. 7, 2015 (JP) .............................. JP2015-136482

(51) Int. Cl.
*H01G 11/48* (2013.01)
*H01G 11/50* (2013.01)
(Continued)

(52) U.S. Cl.
CPC ............ *H01G 11/48* (2013.01); *H01G 11/06* (2013.01); *H01G 11/32* (2013.01); *H01G 11/34* (2013.01);
(Continued)

(58) Field of Classification Search
CPC ........ H01G 11/48; H01G 11/62; H01G 11/86; H01G 11/34; H01M 4/137; H01M 4/606
See application file for complete search history.

(56) References Cited

U.S. PATENT DOCUMENTS 4,971,863 A * 11/1990 Hart ..................... C23C 14/20
                                               428/458
6,495,287 B1 * 12/2002 Kolb ..................... H01M 4/02
                                               429/215
(Continued)

FOREIGN PATENT DOCUMENTS

| JP | 2008-66342 A | 3/2008 |
|----|---|---|
| JP | 2014-175211 A | 9/2014 |

(Continued)

OTHER PUBLICATIONS

Aug. 30, 2016 International Search Report issued in International Patent Application No. PCT/JP2016/067614.

*Primary Examiner* — Jeremiah R Smith
(74) *Attorney, Agent, or Firm* — Oliff PLC

(57) ABSTRACT

An electricity storage device includes a negative electrode having a layered structure that includes an organic backbone layer containing an aromatic compound having an aromatic ring structure, the aromatic compound being in the form of dicarboxylate anions, and an alkali metal element layer containing an alkali metal element coordinated with oxygen in the dicarboxylate anions to form a backbone, a positive electrode that provides electric double-layer capacity, and a nonaqueous electrolyte solution provided between the negative electrode and the positive electrode, the nonaqueous electrolyte solution containing an alkali metal salt. The layered structure may be provided in layers by a π-electron interaction of the aromatic compound and may have a monoclinic crystal structure belonging to the space group (Continued)

P2$_1$/c. The positive electrode may contain activated carbon having a specific surface area of 1,000 m$^2$/g or more.

12 Claims, 6 Drawing Sheets

(51) Int. Cl.

| | |
|---|---|
| *H01M 10/0525* | (2010.01) |
| *H01M 4/60* | (2006.01) |
| *H01G 11/06* | (2013.01) |
| *H01M 10/0566* | (2010.01) |
| *H01G 11/32* | (2013.01) |
| *H01G 11/34* | (2013.01) |
| *H01G 11/62* | (2013.01) |
| *H01M 4/137* | (2010.01) |
| *H01M 4/36* | (2006.01) |
| *H01M 4/587* | (2010.01) |
| *H01M 4/62* | (2006.01) |
| *H01M 4/133* | (2010.01) |
| *H01G 11/86* | (2013.01) |
| *H01M 4/02* | (2006.01) |

(52) U.S. Cl.
CPC ............. *H01G 11/50* (2013.01); *H01G 11/62* (2013.01); *H01M 4/137* (2013.01); *H01M 4/366* (2013.01); *H01M 4/587* (2013.01); *H01M 4/60* (2013.01); *H01M 4/606* (2013.01); *H01M 4/622* (2013.01); *H01M 10/0525* (2013.01); *H01M 10/0566* (2013.01); *H01G 11/86* (2013.01); *H01M 4/133* (2013.01); *H01M 2004/021* (2013.01); *Y02E 60/13* (2013.01)

(56) References Cited

U.S. PATENT DOCUMENTS

| | | | |
|---|---|---|---|
| 2002/0063065 A1* | 5/2002 | Sonoda | H01L 31/1884 205/333 |
| 2002/0102350 A1* | 8/2002 | Endo | H01M 4/04 427/126.1 |
| 2004/0045818 A1* | 3/2004 | Inatomi | H01M 4/606 204/291 |
| 2004/0159964 A1* | 8/2004 | Lavoie | H01M 4/0411 264/40.1 |
| 2004/0179328 A1 | 9/2004 | Ando et al. | |
| 2004/0214082 A1* | 10/2004 | Inatomi | H01M 4/137 429/213 |
| 2006/0057433 A1 | 3/2006 | Ando et al. | |
| 2007/0065719 A1* | 3/2007 | Timonov | H01G 11/48 429/213 |
| 2008/0055819 A1 | 3/2008 | Taguchi et al. | |
| 2012/0208092 A1* | 8/2012 | Ku | H01M 10/052 429/231.95 |
| 2012/0301784 A1* | 11/2012 | Yano | H01M 4/1391 429/213 |
| 2013/0136972 A1* | 5/2013 | Ogihara | H01M 4/661 429/149 |
| 2013/0280604 A1* | 10/2013 | Ogihara | H01M 4/366 429/211 |
| 2016/0111228 A1 | 4/2016 | Okuno et al. | |
| 2016/0336593 A1* | 11/2016 | Honda | H01M 4/525 |
| 2017/0103856 A1* | 4/2017 | Zhamu | H01G 11/50 |
| 2017/0104204 A1* | 4/2017 | Zhamu | H01M 10/054 |
| 2018/0174766 A1* | 6/2018 | Zhamu | H01G 11/86 |
| 2018/0238828 A1* | 8/2018 | Wang | H01M 4/366 |
| 2018/0301290 A1* | 10/2018 | Ogihara | H01M 4/606 |
| 2019/0207200 A1* | 7/2019 | Zhamu | H01M 10/052 |

FOREIGN PATENT DOCUMENTS

| | | | |
|---|---|---|---|
| JP | 2014-183161 A | 9/2014 | |
| JP | 2014175211 | * 9/2014 | ............. H01M 4/60 |
| WO | 03/003395 A1 | 1/2003 | |
| WO | 2004/059672 A1 | 7/2004 | |

* cited by examiner

ELECTRICITY STORAGE DEVICE

TECHNICAL FIELD

The present invention relates to an electricity storage device.

BACKGROUND ART

Hitherto, for example, a lithium-ion capacitor including a positive electrode containing activated carbon and a negative electrode containing graphite has been known as an electricity storage device. To increase the cell voltage of lithium-ion capacitors, pre-doping with lithium, in other words, the absorption or supporting of lithium ions on negative electrodes in advance, has been known (see PTLs 1 to 3).

CITATION LIST

Patent Literature

PTL 1: International Publication No. 2003/003395
PTL 2: International Publication No. 2004/059672
PTL 3: Japanese Unexamined Patent Application Publication No. 2008-66342

SUMMARY OF INVENTION

Technical Problem

For example, in lithium-ion capacitors including graphite negative electrodes and so forth, cells are easily degraded by overdischarge. To prevent the degradation, although cells are restricted in the discharge cutoff voltage, there is a need to easily inhibit the cell degradation due to overdischarge.

The present invention has been accomplished to solve these problems. It is a main object of the present invention to provide an electricity storage device that can more easily inhibit the cell degradation due to overdischarge.

Solution to Problem

To achieve the foregoing object, the inventors have conducted intensive studies and have found that in an electricity storage device including a positive electrode in combination with a negative electrode, the positive electrode providing electric double-layer capacity, the negative electrode having a predetermined layered structure, overdischarge does not easily proceed, so that cell degradation due to overdischarge can be more easily inhibited. This finding has led to the completion of the present invention.

An electricity storage device of the present invention includes:
  a negative electrode having a layered structure that includes an organic backbone layer containing an aromatic compound having an aromatic ring structure, the aromatic compound being in the form of dicarboxylate anions, and an alkali metal element layer containing an alkali metal element coordinated with oxygen in the dicarboxylate anions to form a backbone;
  a positive electrode that provides electric double-layer capacity; and
  a nonaqueous electrolyte solution provided between the negative electrode and the positive electrode, the nonaqueous electrolyte solution containing an alkali metal salt.

Advantageous Effects of Invention

In the electricity storage device of the present invention, cell degradation due to overdischarge can be more easily inhibited. The reason the effect is provided is speculated as follows. For example, in the layered structure used for the negative electrode in the present invention, when a predetermined amount or more of ions absorbed in the layered structure is released by discharge, the resistance increases rapidly to make it difficult to pass a current this function is also referred to as a "shutdown function"). Thus, overdischarge does not easily proceed, thus more easily inhibiting the cell degradation due to overdischarge. The term "overdischarge" indicates that discharge is performed at a voltage less than the discharge cutoff voltage of the cell. The discharge cutoff voltage may be, for example, 1.5 V, which is a common discharge cutoff voltage in the case of using a graphite negative electrode, or 1.0 V.

DESCRIPTION OF EMBODIMENTS

An electricity storage device of the present invention includes a negative electrode having a layered structure of the present invention, a positive electrode providing electric double-layer capacity, and a nonaqueous electrolyte solution that is provided between the negative electrode and the positive electrode and that contains an alkali metal salt. The layered structure of the present invention includes an organic backbone layer containing an aromatic compound that has an aromatic ring structure and that is in the form of dicarboxylate anions, and an alkali metal element layer having a backbone formed by the coordination of an alkali metal element with oxygen contained in the carboxylate anions. In the layered structure, the alkali metal contained in the alkali metal element layer may be at least one selected from, for example, Li, Na, and K and is preferably Li. An alkali metal that is contained in the nonaqueous electrolyte solution and that is absorbed into and released from the layered structure by charge and discharge may be the same or different from the alkali metal element contained in the alkali metal element layer and may be, for example, one or more of Li, Na, K, and so forth. Here, for the purpose of illustration, a lithium-ion capacitor that contains Li in the alkali metal element layer of the layered structure and that contains Li as the alkali metal absorbed into and released from the layered structure by charge and discharge will be mainly described below.

Figure 1:
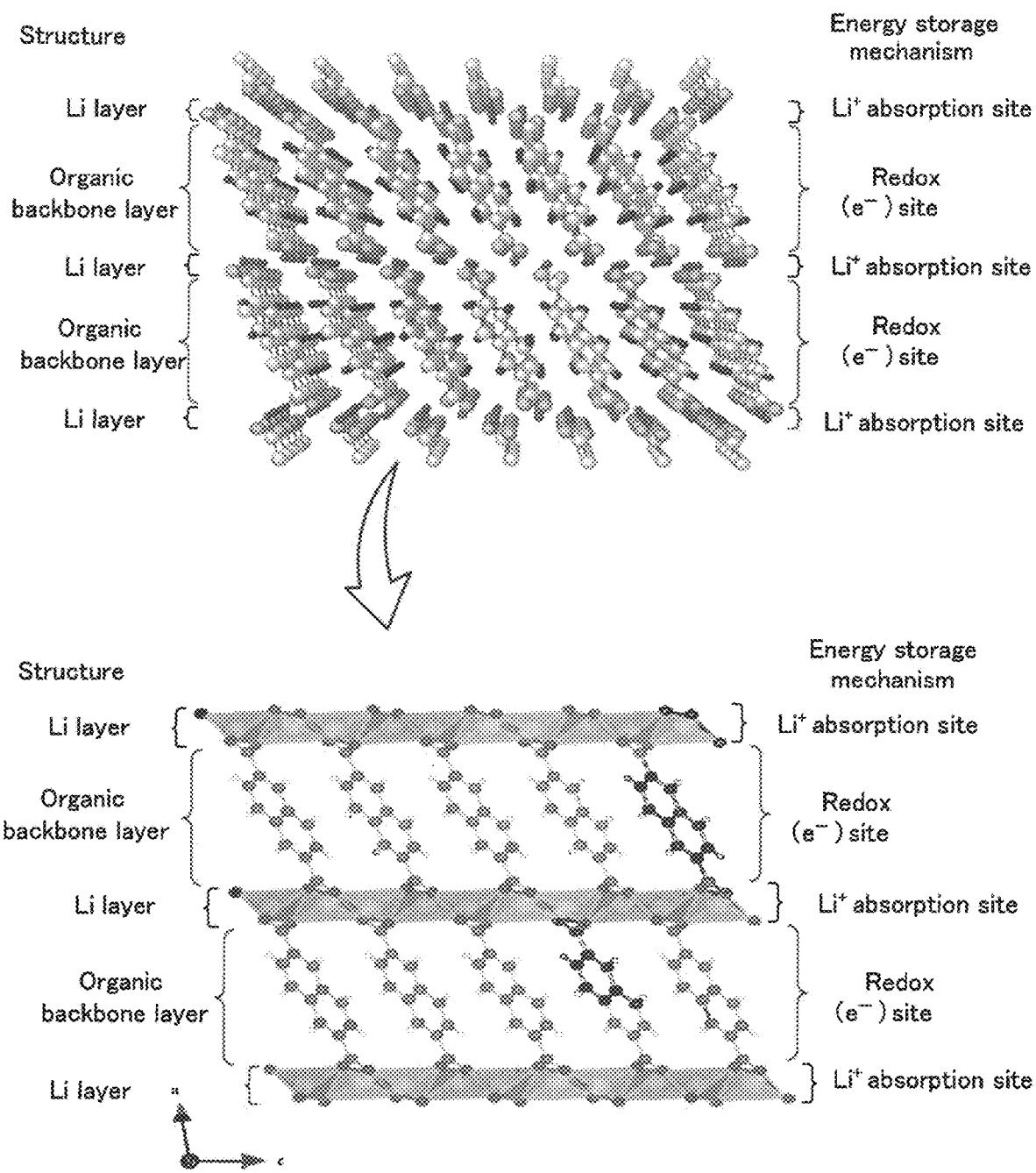
FIG. 1 is an explanatory drawing of an example of the structure of a layered structure.

In the electricity storage device of the present invention, the negative electrode includes the foregoing layered structure of the present invention, the layered structure serving as an active material. FIG. 1 is an explanatory drawing of an example of the structure of the layered structure of the present invention. The layered structure that is formed in layers by the π-electron interaction of the aromatic compound and that has a monoclinic crystal structure belonging to the space group $P2_1/c$ is preferred because of its high structural stability. Furthermore, the layered structure preferably has a structure in which an alkali metal element is tetracoordinated with four oxygen atoms of different dicarboxylate anions, because of its high structural stability, the structure being represented by formula (1). In formula (1), each R represents a structure having one or more aromatic rings, two or more of R may be identical, and one or more of R may be different, and A represents an alkali metal element. As described above, the layered structure preferably has the structure in which the organic backbone layers are linked through the alkali metal element.

[Chem. 1]

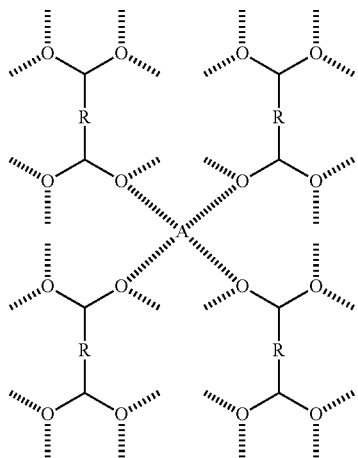

(1)

where each R represents a structure having one or more aromatic rings, two or more of R may be identical, one or more of R may be different, and A represents an alkali metal.

Each of the organic backbone layers contains the aromatic compound that has a structure with one or more aromatic rings and that is in the form of dicarboxylate anions. The aromatic compound may have a structure with one aromatic ring and preferably has a structure with two or more aromatic rings. That is, each R in formula (1) preferably has a structure with two or more aromatic rings. This is because n the structure with two e aromatic rings, the layered structure is easily formed. The structure with two or more aromatic rings may be composed of an aromatic polycyclic compound, such as biphenyl, in which two or more aromatic rings are linked together, or may be composed of a fused polycyclic compound, such as naphthalene, anthracene, or pyrene, in which two or more aromatic rings are fused. The aromatic compound preferably has a structure with five or less aromatic rings because the use of the structure with five or less aromatic rings can result in a higher energy density. Each of the aromatic rings may be a five-membered ring, a six-membered ring, or an eight-membered ring and is preferably a six-membered ring. Each organic backbone layer preferably contains an aromatic compound in which one of the dicarboxylate anions and the other are bonded in diagonal positions of the aromatic ring structure. In this case, the layered structure including the organic backbone layers and the alkali metal element layers is easily formed. The diagonal positions where the carboxylate anions are bonded may be positions to obtain the maximum distance between a binding position of one of the carboxylate anions and a binding position of the other. For example, when the aromatic ring structure is composed of benzene, the 1- and 4-positions (para position) are exemplified. When the aromatic ring structure is composed of naphthalene, the 2- and 6-positions are exemplified. When the aromatic ring structure is composed of pyrene, the 2- and 7-positions are exemplified. Each of the organic backbone layers may be composed of an aromatic compound having a structure represented by formula (2), where R may represent the structure having one or more aromatic rings. Specifically, the organic backbone layer may contain one or more aromatic compounds represented by formulae (3) to (5). In formulae (3) to (5), n is preferably an integer of 1 or more and 5 or less, and m is preferably an integer of 0 or more and 3 or less. When n is 1 or more and 5 or less, the organic backbone layer has an appropriate size, thus further increasing the charge-discharge capacity. When m is 0 or more and 3 or less, the organic backbone layer has an appropriate size, thus further increasing the charge-discharge capacity. In each of formulae (3) to (5), the aromatic compound may have a substituent or a heteroatom in its structure. Specifically, the aromatic compound may have a substituent such as a halogen, a chain or cyclic alkyl group, an aryl group, an alkenyl group, an alkoxy group, an aryloxy group, a sulfonyl group, an amino group, a cyano group, a carbonyl group, an acyl group, an amide group, or a hydroxy group, in place of hydrogen of the aromatic compound. Furthermore, the aromatic compound may have a structure in which nitrogen, sulfur, or oxygen is introduced in place of carbon of the aromatic compound. Li in formulae (3) to (5) represents Li included in the alkali metal element layer.

[Chem. 2]

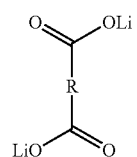

(2)

where R represents a structure having one or more aromatic rings.

[Chem. 3]

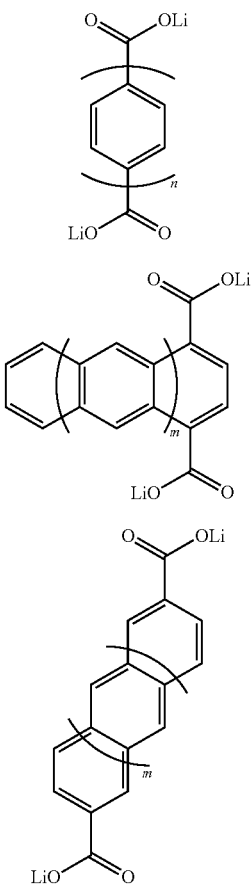

(3)

(4)

(5)

where n is an integer of 1 or more and 5 or less, m is an integer of 0 or more and 3 or less, and the aroma compound may have a substituent or a heteroatom in its structure.

As illustrated in FIG. 1, the backbone of each of the alkali metal element layers is formed by the coordination of the alkali metal element with oxygen contained in the carboxylate anions. The alkali metal element may be one or more of Li, Na, and K and is preferably Li. The alkali metal element contained in the alkali metal element layer is included in the backbone of the layered structure and does not seem to be associated with ion transfer due to charge and discharge, in other words, the alkali metal element does not seem to be absorbed or released during charge and discharge. As illustrated in FIG. 1, the layered structure includes the organic backbone layers and Li layers (alkali metal element layers) provided between the organic backbone layers, from a structural point of view, With regard to an energy storage mechanism, the organic backbone layers of the layered structure seem to function as redox ($e^-$) sites, and the Li layers seem to function as $Li^+$ absorption sites (alkali-metal-ion absorption sites). That is, the layered structure seems to store and release energy as illustrated in formula (6). Furthermore, the organic backbone layers of the layered structure can have a space where Li can enter. In this case, Li can be absorbed into and released from portions other than the alkali metal layers in formula (6), thus possibly further increasing the charge-discharge capacity.

[Chem. 4]

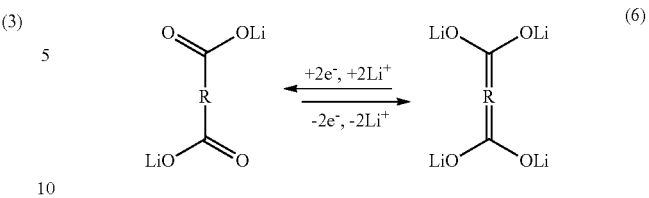

(6)

The negative electrode may be formed by, for example, mixing an active material having the layered structure with other materials, adding an appropriate solvent thereto to prepare a paste-like negative electrode mixture, applying the mixture to a surface of a current collector, drying the applied mixture, and, if necessary, performing compression in order to increase the electrode density.

The negative electrode mixture preferably contains a water-soluble polymer. The water-soluble polymer may be at least one of carboxymethyl cellulose or poly(vinyl alcohol). The water-soluble polymer may serve as a binder that retains active material particles and conductive material particles. The carboxymethyl cellulose may be used in the form of an inorganic salt in which, for example, sodium or potassium is bonded to an end of a carboxymethyl group or in the form of an ammonium salt in which ammonium is bonded to an end of a carboxymethyl group. In the case where the negative electrode mixture contains the water-soluble polymer, the negative electrode mixture preferably contains 2% or more by mass and 8% or less by mass of the water-soluble polymer. The negative electrode mixture containing 2% or more by mass of the water-soluble polymer can further increase the capacity retention ratio. The use of the negative electrode mixture containing 8% or less by mass of the water-soluble polymer results in high adhesion between electrode materials and between the electrode materials and a current collector. The negative electrode mixture preferably contains 7% or less by mass, more preferably 6% or less by mass of the water-soluble polymer.

The negative electrode mixture may contain a styrene-butadiene copolymer in addition to the water-soluble polymer. The styrene-butadiene copolymer may serve as a binder that retains the active material particles and the conductive material particles. The negative electrode mixture containing the styrene-butadiene copolymer is preferred because the active material particles can be more strongly bonded together. In the case where the negative electrode mixture contains the styrene-butadiene copolymer, the negative electrode mixture preferably contains 8% or less by mass of the styrene-butadiene copolymer. At 8% or less by mass, the amounts of the active material, the conductive material, and the water-soluble polymer are not so small; thus, the functions of the active material, the conductive material, and the water-soluble polymer can be sufficiently provided.

The negative electrode mixture preferably contains the conductive material. The conductive material is not particularly limited as long as it is an electron-conducting material that does not affect the battery performance. Examples of the conductive material include carbon materials, for example, graphites, such as natural graphites (e.g., scaly graphite and flake graphite) and artificial graphites, acetylene black, carbon black, Ketjenblack, carbon whiskers, needle coke, and carbon fibers, and metals (copper, nickel, aluminum, silver, gold, and so forth). They can be used alone or in combination as a mixture of two or more. Among the conductive materials, carbon black and acetylene black are preferred in view of electron conductivity and coatability. In the case where the negative electrode mixture contains the conductive material, the negative electrode mixture preferably contains 5% or more by mass and 15% or less by mass of the conductive material. The negative electrode mixture may contain 7% or more by mass or 9% or more by mass of the conductive material. At 5% or more by mass, the electrode can have sufficient conductivity, and the degradation of the charge-discharge characteristics can be inhibited. At 15% or less by mass, the amounts of the ac material and the water-soluble polymer are not so small; thus, the functions of the active material and the water-soluble polymer can be sufficiently provided.

The negative electrode mixture preferably contains 70% or more by mass and 90% or less by mass of the active material and may contain 75% or more by mass and 85% or less by mass of the active material. In general, an electrode containing an organic active material has low conductivity. It is thus necessary to improve the conductivity by addition of a large amount of the conductive material. The amount of the active material is less than 70% by mass. In contrast, in the present invention, the active material can be increased to 70% or more by mass, which is preferred. In the case of the negative electrode mixture containing 90% or less by mass of the active material, the amounts of the conductive material and the water-soluble polymer are not so small, the functions of the conductive material and the water-soluble polymer can be sufficiently provided.

The negative electrode mixture may contain a binder in place of or in addition to the water-soluble polymer and the styrene-butadiene copolymer. The binder serves to retain the active material particles and the conductive material particles. Examples thereof include fluorine-containing resins such as polytetrafluoroethylene (PTFE), poly(vinylidene fluoride) (PVdF), and fluorocarbon rubber, thermoplastic resins such as polypropylene and polyethylene, ethylene-propylene-diene monomer (EPDM) rubber, sulfonated EPDM rubber, and natural butyl rubber (NBR). These may be used alone or in combination as a mixture of two or more.

As a solvent used to disperse the active material and other materials, water may be used. For example, an organic solvent, such as N-methylpyrrolidone, dimethylformamide, dimethylacetamide, methyl ethyl ketone, cyclohexanone, methyl acetate, methyl acrylate, diethylenetriamine, N,N-dimethylaminopropylamine, ethylene oxide, or tetrahydrofuran, may also be used. In the case where the water-soluble polymer and styrene-butadiene copolymer are used as a binder, water is preferred. Examples of an application method include roller coating with an applicator roll or the like, screen coating, a doctor blade method, spin coating, and a bar coater, any of which can be used to provide any thickness and shape.

Examples of current collectors include copper, nickel, stainless steel, titanium, aluminum, baked carbon, conductive polymers, conductive glass, and Al—Cd alloys. Furthermore, in order to improve adhesion, conductivity, and resistance to reduction, a current collector in which, for example, a copper surface is treated with carbon, nickel, titanium, or the like may be used. The collector of the negative electrode is more preferably composed of metallic aluminum. That is, the layered structure is preferably arranged on a current collector of metallic aluminum. This is because aluminum is abundant and is highly resistant to corrosion. These current collectors can also be surface-treated by oxidation. Examples of the shape of the current collector include foil, films, sheets, nets, punched or expanded shapes, laths, porous shapes, foams, and fiber bundles. The collector has a thickness of, for example, 1 to 500 μm.

The negative electrode may be formed by arranging the negative electrode mixture and the conductive material on the current collector, the negative electrode mixture containing the layered structure including organic backbone layer containing the aromatic compound that is in the form of the dicarboxylate anions having the aromatic ring structure (preferably, a naphthalene backbone or benzene backbone) and the alkali metal element layer containing the alkali metal element coordinated with oxygen in the dicarboxylate anions to form a backbone, and then subjecting the negative electrode mixture to baking treatment in a temperature range of 250° C. or higher and 450° C. or lower in an inert atmosphere. In this case, a more preferred crystal structure can be provided to enhance the n-electron interaction of the aromatic compound, thus further enhancing the charge-discharge characteristics because of easy transfer of electrons. In the baking treatment, a baking temperature of 250° C. or higher is preferred because the charge-discharge characteristics can be improved. A baking temperature of 450° C. or lower is preferred because structural damage to the layered structure can be further inhibited. The baking temperature is preferably 275° C. or higher, more preferably 350° C. or lower, even more preferably about 300° C. The baking time is selected, depending on the baking temperature, and is preferably, for example, 2 hours or more and 24 hours or less. The inert atmosphere may be of an inert gas such as nitrogen gas, He, or Ar. In particular, Ar is preferred.

The negative electrode may be pre-doped with alkali metal ions. In other words, the alkali metal ions may be absorbed in and/or supported by the negative electrode in advance. In this case, the cell voltage of the electricity storage device can be increased to increase the charge-discharge capacity. In the case of using, for example, a graphite negative electrode, pre-doping with alkali metal ions is liable to cause, in particular, overdischarge to proceed. In contrast, in the case of using the negative electrode having the layered structure of the present invention, overdischarge does not easily proceed, regardless of whether pre-doping is performed or not. As a pre-doping method, a known method such as a method described in any of PTLs 1 to 3 can be employed. For example, before the negative electrode is incorporated into an electricity storage device, a cell including a counter electrode composed of an alkali metal may be separately assembled, and then the negative electrode may be doped with a predetermined amount of an alkali metal. For example, the negative electrode may be doped with an alkali metal by placing the alkali metal in an electricity storage device and bringing the alkali metal into electrochemical contact with the negative electrode.

In the electricity storage device of the present invention, the positive electrode is not limited as long as it provides an electric double-layer capacity. A known positive electrode used for a capacitor and a lithium-ion capacitor may be used. The positive electrode may contain, for example, a carbon material. Examples of the carbon material include, but are not particularly limited to, activated carbons, coke, glassy carbons, graphites, non-graphitizable carbons, pyrolytic carbons, carbon fibers, carbon nanotubes, and polyacenes. Among these, an activated carbon is preferred because of its large specific surface area. The activated carbon serving as a carbon material preferably has a specific surface area of 1,000 m$^2$/g or more, more preferably 1,500 m$^2$/g or more. A specific surface area of 1,000 m$^2$/g or more can result in a higher discharge capacity. The activated carbon preferably has a specific surface area of 3,000 m$^2$/g or less, more preferably 2,000 m$^2$/g or less in view of the ease of production. In the positive electrode, electricity is presumably stored by absorption and desorption of at least one of an anion and a cation contained in the nonaqueous electrolyte solution. Furthermore, electricity may be stored by intercalation and deintercalation of at least one of the anion and the cation contained in the nonaqueous electrolyte solution.

The positive electrode may be formed by, for example, mixing the carbon material, a conductive material, and a binder, adding an appropriate solvent thereto to form a paste-like positive electrode mixture, applying the mixture to a surface of a current collector and drying it, and optionally performing compression in order to increase the electrode density. The conductive material, the binder, the solvent, and so forth exemplified for the negative electrode may be used for those for the positive electrode. As the current collector of the positive electrode, aluminum, titanium, stainless steel, nickel, iron, baked carbon, a conductive polymer, and a conductive glass can be used. In addition, for the purpose of improving adhesion, conductivity, and oxidation resistance, a component composed of, for example, aluminum or copper having a surface treated with, for example, carbon, nickel, titanium, or silver may be used. These may be subjected to surface oxidation treatment. The current collector may have the same shape as that of the negative electrode. The current collector of the positive electrode may be the same as that of the negative electrode.

In the electricity storage device of the present invention, the positive electrode and the negative electrode are used in combination such that the capacity ratio of electric capacity B (mAh) of the negative electrode to electric capacity A (mAh) of the positive electrode, i.e., B/A, is preferably 6 or more, more preferably 7 or more in a voltage range in which charge and discharge are performed. In this case, a high energy density can be stably obtained. The B/A ratio may be, for example, 20 or less or 15 or less. In this range, because the amount of the negative electrode active material is not excessively large, the negative electrode active material can be more effectively used.

In the electricity storage device of the present invention, as the nonaqueous electrolyte solution, for example, an organic solvent containing a supporting electrolyte (inert electrolyte) can be used. As the supporting electrolyte, a known supporting electrolyte such as an alkali metal salt can be used. Examples of the alkali metal salt include lithium salts such as LiPF$_6$, LiClO$_4$, LiAsF$_6$, LiBF$_4$, Li(CF$_3$SO$_2$)$_2$N, and LiN(C$_2$F$_5$SO$_2$)$_2$, and sodium salts and potassium salts corresponding thereto. These supporting electrolytes may be used alone or in combination. The concentration of the supporting electrolyte is preferably 0.1 to 2.0 M, more preferably 0.8 to 1.2 M. As the organic solvent, for example, an aprotic organic solvent can be used. Examples of the organic solvent include cyclic carbonates, chain carbonates, cyclic esters, cyclic ethers, and chain ethers. Examples of cyclic carbonates include ethylene carbonate, propylene carbonate, butylene carbonate, and vinylene carbonate. Examples of chain carbonates include dimethyl carbonate, diethyl carbonate, and methyl ethyl carbonate. Examples of cyclic ester include γ-butyrolactone and γ-valerolactone. Examples of cyclic ethers include tetrahydrofuran and 2-methyltetrahydrofuran. Examples of chain ethers include dimethoxyethane and ethylene glycol dimethyl ether. These may be used alone or in combination as a mixture. As the nonaqueous electrolyte solution, in addition, a nitrile-based solvent such as acetonitrile or propylnitrile, an ionic liquid, a gel electrolyte, or the like may be used.

The electricity storage device of the present invention may include a separator between the positive electrode and the negative electrode. The separator is not particularly limited as long as it has a composition that can withstand service conditions of the electricity storage device. Examples of the separator include polymer nonwoven fabrics, such as polypropylene nonwoven fabrics and polyphenylene sulfide nonwoven fabrics, and microporous films composed of olefin resins, such as polyethylene and polypropylene. These may be used alone or in combination.

Figure 2:
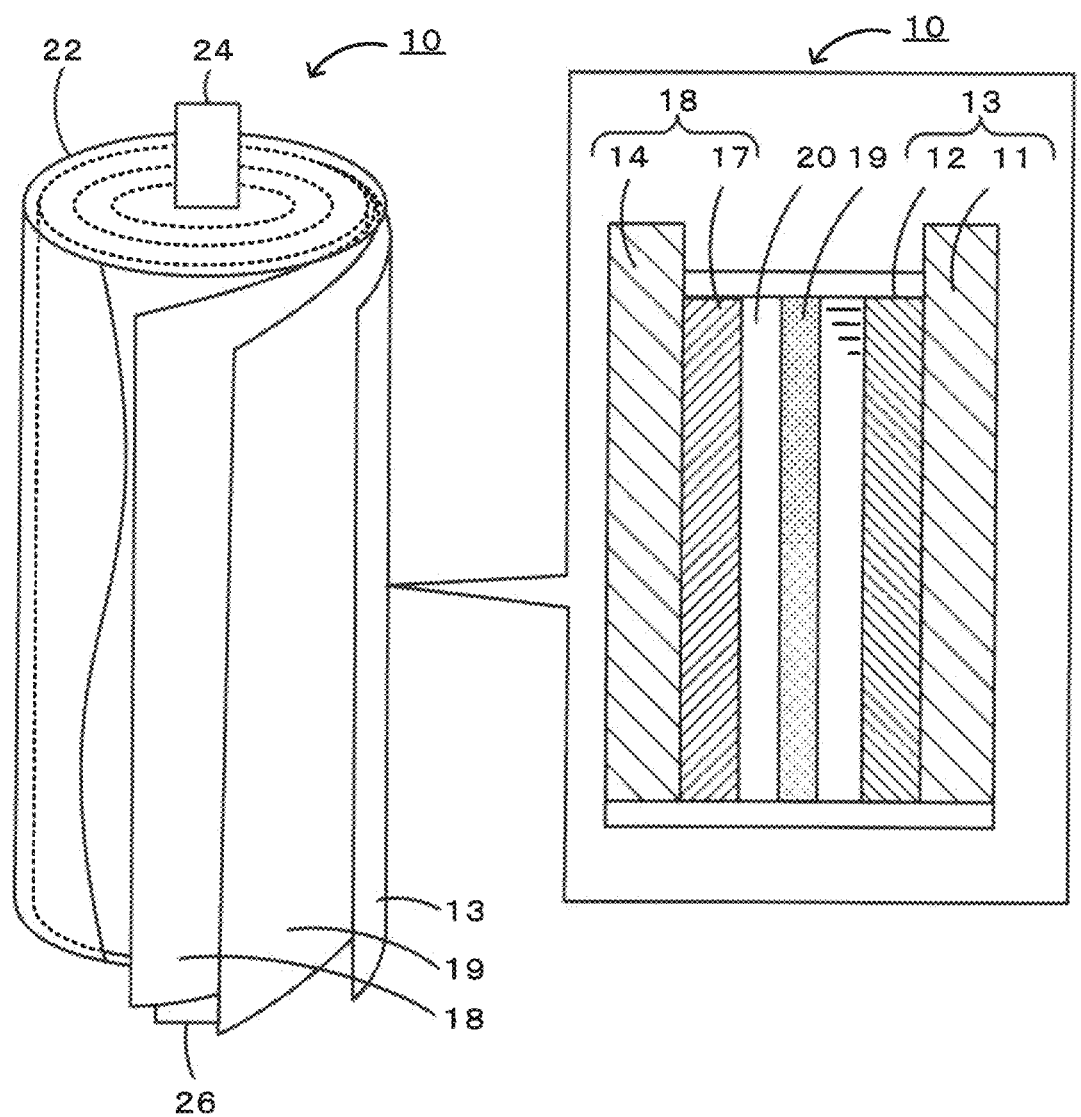
FIG. 2 is an explanatory drawing of an example of an electricity storage device 10.

The shape of the electricity storage device of the present invention is not particularly limited. Examples thereof include coin shapes, button shapes, sheet shapes, laminate shapes, cylindrical shapes, flat shapes, and prismatic shapes. The electricity storage device may have a large size for use in, for example, an electric vehicle. FIG. 2 is a schematic diagram illustrating an example of the electricity storage device 10 according to the foregoing embodiment. The electricity storage device 10 includes a positive electrode sheet 13 having a positive electrode mixture 12 on a current collector 11, a negative electrode sheet 18 having a negative electrode mixture 17 on a surface of a current collector 14, a separator 19 provided between the positive electrode sheet 13 and the negative electrode sheet 18, and a nonaqueous electrolyte solution 20 with which the gap between the positive electrode sheet 13 and the negative electrode sheet 18 is filled. In the electricity storage device 10, the separator 19 is interposed between the positive electrode sheet 13 and the negative electrode sheet 18, these components are wound and placed in a cylindrical case 22, and a positive electrode terminal 24 connected to the positive electrode sheet 13 and a negative electrode terminal 26 connected to the nonaqueous electrolyte solution are arranged. The positive electrode mixture contains a material that provides electric double-layer capacity. The negative electrode mixture contains a layered structure including an organic backbone layer containing an aromatic compound having an aromatic ring structure, the aromatic compound being in the form of dicarboxylate anions, and an alkali metal element layer containing an alkali metal element coordinated with oxygen in the dicarboxylate anions to form a backbone.

In the electricity storage device according to the embodiment, cell degradation due to overdischarge, for example, the cell degradation due to the generation of a gas such as hydrogen gas, a reaction of the generated gas, and so forth, can be more easily inhibited. The reason the effect is provided is speculated as follows. For example, in the layered structure used for the negative electrode in the present invention, when a predetermined amount or more of ions absorbed in the layered structure is released by discharge, the resistance increases rapidly to provide the shutdown function. Thus, overdischarge does not easily proceed to more easily inhibit the cell degradation due to overdischarge. In particular, in the case where a graphite negative electrode is pre-doped with alkali metal ions, overdischarge proceeds particularly easily. In contrast, in the case of using the negative electrode including the layered structure of the present invention, the resistance of the negative electrode increases rapidly prior to an overdischarge state or the proceeding of overdischarge to provide the shutdown function, regardless of whether pre-doping is performed or not, thus more easily inhibiting the cell degradation due to overdischarge. After the shutdown, when charge is performed, lithium ions are absorbed in the negative electrode to reduce the resistance of the negative electrode to the initial level; thus, charge and discharge can be performed again.

The present invention is not limited to the foregoing embodiments. It will be obvious that various modifications may be made within the technical scope of the present invention.

EXAMPLES

Examples of the specific production of an electricity storage device of the present invention will be described below. Experimental examples 1, 3, and 5 to 12 correspond to examples of the present invention. Experimental examples 2 and 4 correspond to comparative examples. The present invention is not limited to these examples described below. It will be obvious that various modifications may be made within the technical scope of the present invention.

1. Shutdown Function at the time of Overdischarge

Experimental Example 1

(Synthesis of Dilithium 2,6-Naphthalenedicarboxylate)

For the synthesis of dilithium 2,6-naphthalenedicarboxylate serving as a layered structure, 2,6-naphthalenedicarboxylic acid and lithium hydroxide monohydrate (LiOH·H$_2$O) were used as starting materials. Specifically, methanol (100 mL) was added to lithium hydroxide monohydrate (0.556 g), and the mixture was stirred. After lithium hydroxide monohydrate was dissolved, 2,6-naphthalenedicarboxylic acid (1.0 g) was added thereto, and the resulting mixture was stirred for 1 hour, After the stirring was completed, the solvent was removed. The resulting product was dried at 150° C. for 16 hours in vacuum to synthesize lithium 2,6-naphthalenedicarboxylate (formula (7)) as a white powder.

[Chem. 5]

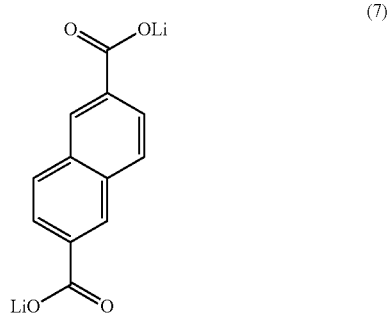

(7)

(Production of Lithium 2,6-Naphthalenedicarboxylate Negative Electrode)

First, 77.7% by mass of lithium 2,6-naphthalenedicarboxylate, serving as an active material, prepared by the method described above, 13.7% by mass of carbon black (TB5500 (diameter: about 50 nm), Tokai Carbon Co., Ltd.) serving as a conductive granular carbon material, 5.5% by mass of carboxymethyl cellulose (CMC) (CMC Daicel 1120, Daicel FineChem Ltd.) serving as a water-soluble polymer, and 3.2% by mass of a styrene-butadiene copolymer (SBR) (BM-400B, Zeon Corporation) were mixed together. An appropriate amount of water serving as a dispersion media was added thereto. The mixture was subjected to dispersion to prepare a slurry-like mixture. The slurry-like mixture was uniformly applied to a copper foil current collector having a thickness of 10 μm in such a manner that the amount of the lithium 2,6-naphthalenedi-carboxylate active material was 3.5 mg/cm$^2$ per unit area, and was dried by heating to form a coated sheet. Then the coated sheet was pressed and punched to provide a disk-like negative electrode having an area of 2.05 cm$^2$.

(Production of Two-Electrode Test Cell)

Lithium hexafluorophosphate was added to a solvent mixture of 30:40:30 (by volume)ethylene carbonate/dimethyl carbonate/ethyl methyl carbonate in such a manner that the concentration of lithium hexafluorophosphate was 1 mol/L, thereby preparing a nonaqueous electrolytic solution. The lithium 2,6-naphthalenedicarboxylate negative electrode was used as a working electrode, Lithium metal foil (thickness: 300 μm) was used as a counter electrode. A separator (available from Toray Tonen Co., Ltd.) impregnated with the nonaqueous electrolytic solution was interposed between the electrodes to produce a two-electrode test cell.

(Intermittent Charge-Discharge Test)

The two-electrode evaluation cell was subjected to an intermittent charge-discharge test in an environment having a temperature of 20° C. as described below. Discharge (reduction of the working electrode) was performed at 20 mAh/g and a current of 0.15 mA (a current value corresponding to 10-hour discharge with respect to a reference capacity of 200 mAh/g). Then the cell was in an open-circuit state and allowed to stand until a change in voltage was 1 mV/800 sec. or less (up to 6 hours). This intermittent energization and open-circuit standing operation was repeated 20 cycles in a discharge direction to perform an intermittent discharge test. Next, charge was performed (oxidation of the working electrode) at 20 mAh/g and a current of 0.15 mA. Then the cell was in an open-circuit state and allowed to stand until a change in voltage was 1 mV/800 sec. or less (up to 6 hours), This intermittent energization and op circuit standing operation was repeated in a charge direction to perform an intermittent charge test. With regard to the number of cycles, the operation was repeated until the internal resistance R reached about 670Ω. The internal resistance R was determined by measuring voltage V0 before energization (during the open-circuit state) and voltage V1 1 second after energization in each of the energization and open-circuit operations and performing a calculation using the formula R=(V0−V1)/I from voltages V0 and V1 and current I (=0.15 mA).

Experimental Example 2

A graphite in which d$_{002}$=0.388 nm or less was used as an active material in place of lithium 2,6-naphthalenedicarboxylate. First, 95% by mass of this active material and 5% by mass of poly(vinylidene fluoride) (KF polymer, available from Kureha Corporation) serving as a binder were mixed together and were dispersed in NMP to prepare a negative electrode mixture paste. The paste was applied to both surfaces of copper foil having a thickness of 10 μm, dried, and roll-pressed to adjust the porosity of the mixture layer to 36%, thereby producing a graphite negative electrode having a sheet shape. The intermittent charge-discharge test was performed as Experimental example 1, except that the resulting graphite negative electrode was used as the working electrode, and the energization conditions in the intermittent charge-discharge test were as follows: discharge (or charge) was performed at 37 mAh/g and a current of 0.15 mA, and with regard to the number of cycles, the operation was repeated until the internal resistance R reached about 140Ω.

Experimental Results

Figure 3:
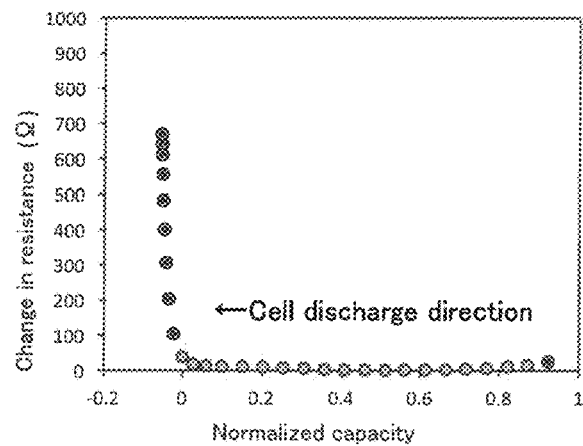
FIG. 3 is a graph illustrating a change in internal resistance against the normalized capacity in Experimental example 1.
Figure 4:
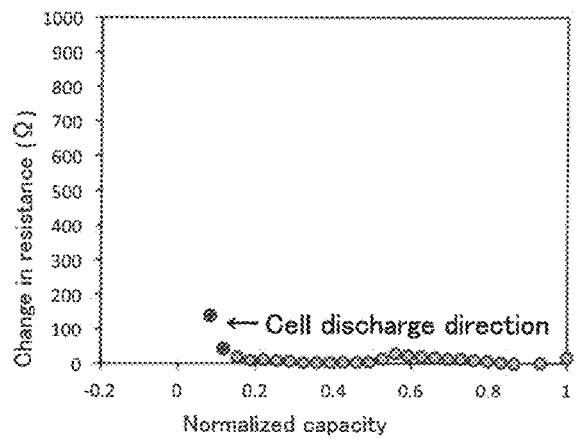
FIG. 4 is a graph illustrating a change in internal resistance against the normalized capacity in Experimental example 2.

FIGS. 3 and 4 each illustrate a change in internal resistance in Experimental examples 1 and 2. In Experimental example 1, the normalized capacity indicates remaining capacity when a reference capacity of 215 mAh/a is normalized as 1. In Experimental example 2, the normalized capacity indicates a remaining capacity when a reference capacity of 360 mAh/g is normalized as 1. The change in internal resistance illustrated in each of FIGS. 3 and 4 corresponds to a change in the internal resistance of the negative electrode in the lithium-ion capacitor including the lithium 2,6-naphthalenedicarboxylate negative electrode or the graphite negative electrode and the activated carbon electrode serving as the positive electrode in a cell discharge direction (a direction in which the deintercalation of lithium from the layered structure proceeds). In Experimental example 1 in which the lithium 2,6-naphthalenedicarboxylate negative electrode was used, the internal resistance was rapidly increased in the cell discharge direction. In Experimental example 2 in which the graphite negative electrode was used, the internal resistance was not significantly increased. The change in internal resistance illustrated in each of FIGS. 3 and 4 was obtained prior to an overdischarge state (here, a state corresponding to a cell voltage of 1.5 V or less in the lithium-ion capacitor). In FIG. 4, although the internal resistance was increased from a normalized capacity of 0.2 or less in the cell discharge direction, after that, the increase in internal resistance was stopped, and the internal resistance converges to a resistance close to the resistance of the low-resistance graphite negative electrode. In contrast, in FIG. 3, because the layered structure is an insulating material, the internal resistance continues to increase.

The foregoing results indicated that the lithium-ion capacitor including 2,6-naphthalenedicarboxylic acid negative electrode had the shutdown function in which, for example, the rapid increase in the internal resistance of the negative electrode prior to overdischarge hindered the flow of a current to control an abnormal reaction.

2. Study on Heat Generation

Experimental Example 3

(Production of Lithium 2,6-Naphthalenedicarboxylate Negative Electrode)

First, 60.0% by mass of lithium 2,6-naphthalenedicarboxylate prepared as in Experimental example 1, 10.0% by mass of a vapor-grown carbon fiber (VGCF), serving as a conductive fibrous carbon material, having a specific surface area of 13 $m^2$/g and an average fiber length of 15 μm, 20.0% by mass of carbon black, serving as conductive granular carbon material, having a specific surface area of 225 $m^2$/g and an average particle size of 25 nm, and 10.0% by mass of poly(vinylidene fluoride) serving as a binder were mixed together. An appropriate amount of N-methyl-2-pyrrolidone serving as a dispersion material was added thereto. The mixture was subjected to dispersion to prepare a slurry-like mixture. The slurry-like mixture was uniformly applied to a copper foil current collector having a thickness of 10 μm and dried by heating to form a coated sheet. Then the coated sheet was pressed and punched to provide a disk-like negative electrode having an area of 2.05 $cm^2$.

(Production of Two-Electrode Test Cell)

Lithium hexafluorophosphate was added to a nonaqueous solvent mixture of 30:40:30 (by volume)ethylene carbonate/dimethyl carbonate/ethyl methyl carbonate in such a manner that the concentration of lithium hexafluorophosphate was 1 mol/L, thereby preparing a nonaqueous electrolytic solution. The negative electrode was used as a working electrode. Lithium metal foil (thickness: 300 μm) was used as a counter electrode. A separator (available from Tonen Tapyrus Co., Ltd.) impregnated with the nonaqueous electrolytic solution was interposed between the electrodes to produce a two-electrode test cell.

(Measurement of Heat Generation of Negative Electrode in State in Which Li is absorbed)

The two-electrode test cell was reduced (charged) to 0.5 V at 0.02 mA in an environment having a temperature of 20° C. The mixture was peeled from the sheet negative electrode in an amount of 3.8 mg. Then 2 μL of the electrolyte solution was added to a stainless-steel container. The stainless-steel container was hermetically sealed and subjected to differential scanning calorimetry under conditions: a heating temperature of 450° C., and a rate of temperature increase of 5° C./min.

Experimental Example 4

The measurement of the heat generation of the negative electrode in a state in which Li was absorbed was performed as in Experimental example 3, except that the graphite negative electrode of Experimental example 2 was used as the negative electrode of the two-electrode test cell, and reduction (charge) was performed to 0.05 V at 0.02 mA in an environment having a temperature of 20° C.

Experimental Results

Figure 5:
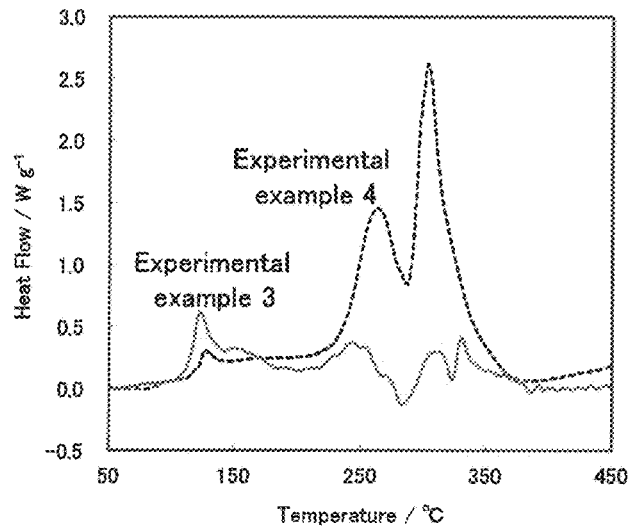
FIG. 5 is a graph illustrating the results of differential scanning calorimetry in Experimental examples 3 and 4.
Figure 6:
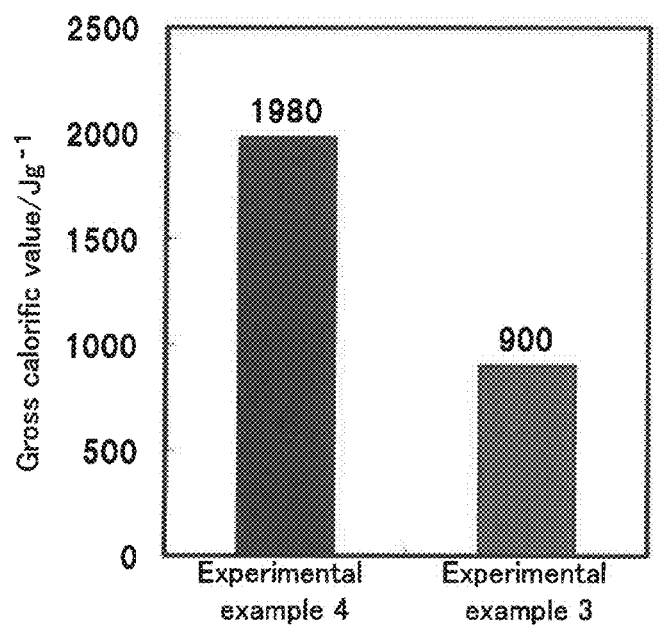
FIG. 6 is a graph illustrating the gross calorific value in Experimental examples 3 and 4.
Figure 7:
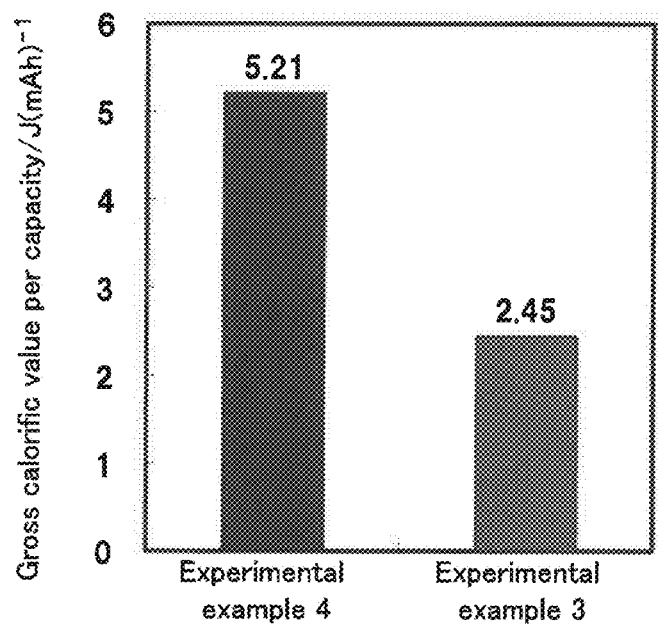
FIG. 7 is a graph illustrating the gross calorific value per capacity in Experimental examples and 4.

FIG. 5 illustrates the results of the differential scanning calorimetry of Experimental examples 3 and 4. FIG. 6 illustrates the gross calorific value in Experimental examples 3 and 4. FIG. 7 illustrates the gross calorific value per capacity in Experimental examples 3 and 4. FIGS. 5 to 7 indicated that the calorific value of the lithium 2,6-naphthalenedicarboxylate negative electrode was smaller than that of the graphite negative electrode. It was thus found that the calorific value of a lithium-ion capacitor including the lithium 2,6-naphthalenedicarboxylate negative electrode should be smaller than that of a lithium-ion capacitor including the graphite negative electrode.

3. Discharge Characteristics

Experimental Example 5

(Production of Lithium 2,6-Naphthalenedicarboxylate Negative Electrode)

A dilithium 2,6-naphthalenedicarboxylate negative electrode of Experimental example 5 was produced as in Experimental example 1, except that lithium 2,6-naphthalenedicarboxylate was uniformly applied to the copper foil current collector in such a manner that the amount of lithium 2,6-naphthalenedicarboxylate was 2.0 mg/$cm^2$ per unit area.

(Production of Activated Carbon Positive Electrode)

First, 33% by mass of coconut shell-derived activated carbon (YP-50F, available from Kuraray Chemical Co., Ltd.), 10.7% by mass of carbon black (TB5500, Tokai Carbon Co., Ltd.) serving as a conductive granular carbon material, 4% by mass of carboxymethyl cellulose (CMC) (CMC Daicel 1120, Daicel FineChem Ltd.) serving as a water-soluble polymer, and 2.3% by mass of a styrene-butadiene copolymer (SBR) (BM-400B, Zeon Corporation) were mixed together. An appropriate amount of water serving as a dispersion media was added thereto. The mixture was subjected to dispersion to prepare a slurry-like mixture.

The slurry-like mixture was uniformly applied to an aluminum foil current collector having a thickness of 15 μm in such a manner that the amount of the activated carbon was 3 mg/cm² per unit area, and was dried by heating to form a coated sheet. Then the coated sheet was pressed and punched to provide a disk-like electrode having an area of 2.05 cm². The electrode was baked at 300° C. for 12 hours in an inert argon atmosphere.

(Production of Two-Electrode Test Cell)

Lithium hexafluorophosphate was added to a nonaqueous solvent mixture of 30:40:30 (by volume) ethylene carbonate/dimethyl carbonate ethyl methyl carbonate in such a manner that the concentration of lithium hexafluorophosphate was 1 mol/L, thereby preparing a nonaqueous electrolytic solution. A separator (available from Toray Tonen Co. Ltd.) impregnated with the nonaqueous electrolyte solution was interposed between the lithium 2,6-naphthalenedicarboxylate negative electrode and the activated carbon positive electrode to produce a two-electrode test cell. The lithium 2,6-naphthalenedicarboxylate negative electrode used was provided in advance by producing a two-electrode test cell including a lithium 2,6-naphthalenedicarboxylate electrode serving as a working electrode, lithium metal foil (thickness: 300 μm) serving as a counter electrode, and a separator (available from Toray Tonen Co., Ltd.) impregnated with the nonaqueous electrolyte solution, the separator being provided between both electrodes, performing reduction to 0.5 V at 0.075 mA in an environment having a temperature of 20° C., performing oxidation to 1.5 V at 0.075 mA, calculating the capacity density of the electrode, and performing reduction to half the capacity density.

(Charge-Discharge Test)

In an environment having a temperature of 20° C., the two-electrode test cell was charged to 3.4 V at 0.3 mA and then discharged to 1.5 V at 0.3 mA. This charge-discharge operation was repeated five cycles. Then the same charge-discharge operation was performed at different charge voltages of 3.7, 4.0, and 4.2 V.

Experimental Examples 6 to 8

A charge-discharge test of Experimental example 6 was performed as in Experimental example 5, except that lithium 2,6-naphthalenedicarboxylate was uniformly applied in an amount of 4 mg/cm² per unit area. A charge-discharge test of Experimental example 7 was performed as in Experimental example 5, except that lithium 2,6-naphthalenedicarboxylate was uniformly applied in an amount of 6 mg/cm² per unit area. A charge-discharge test of Experimental example 8 was performed as in Experimental example 5, except that lithium 2,6-naphthalenedicarboxylate was uniformly applied in an amount of 8 mg/cm² per unit area.

Experimental Example 9

(Production of Lithium 4,4'-Biphenyldicarboxylate Negative Electrode)

Lithium 4,4' biphenyldicarboxylate (formula (8)) serving as the layered structure was synthesized from 4,4'-biphenyldicarboxylic acid and lithium hydroxide monohydrate by the same synthesis method as that of lithium 2,6-naphthalenedicarboxylate. A charge-discharge test of Experimental example 9 was performed as in Experimental example 5, except that the synthesized lithium 4,4'-biphenyldicarboxylate was used as the active material and was uniformly applied in an amount of 2 mg/cm² per unit area.

[Chem. 6]

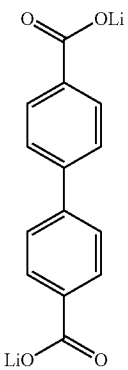

(8)

Experimental Examples 10 to 12

A charge-discharge test of Experimental example 10 was performed as in Experimental example 9, except that lithium 4,4'-biphenyldicarboxylate was uniformly applied in an amount of 4 mg/cm² per unit area. A charge-discharge test of Experimental example 11 was performed as in Experimental example 9, except that lithium 4,4'-biphenyldicarboxylate was uniformly applied in an amount of 6 mg/cm² per unit area. A charge-discharge test of Experimental example 12 was performed as in Experimental example 9, except that lithium 4,4'-biphenyldicarboxylate was uniformly applied in an amount of 8 mg/cm² per unit area.

Experimental Results

Figure 8:
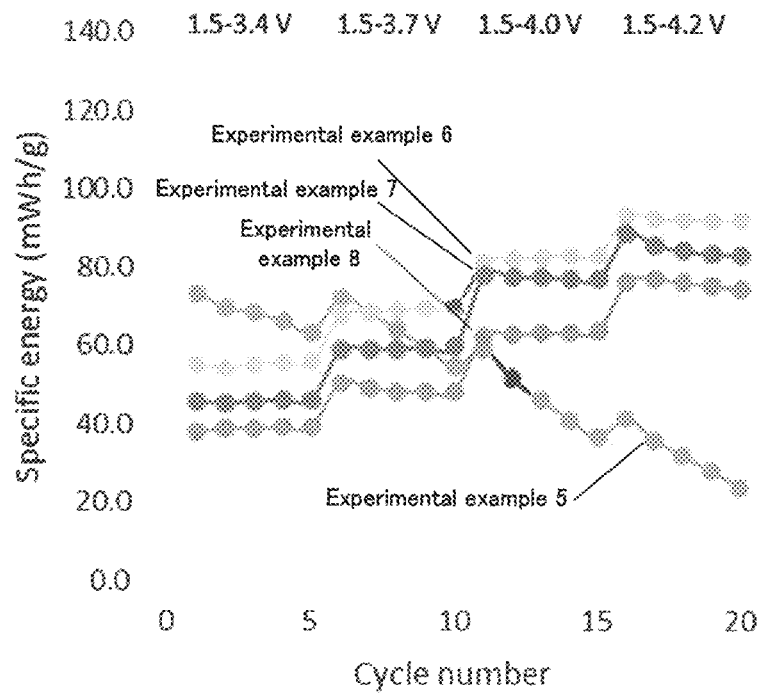
FIG. 8 is a graph illustrating the energy density under charge-discharge conditions of Experimental examples 5 to 8.
Figure 9:
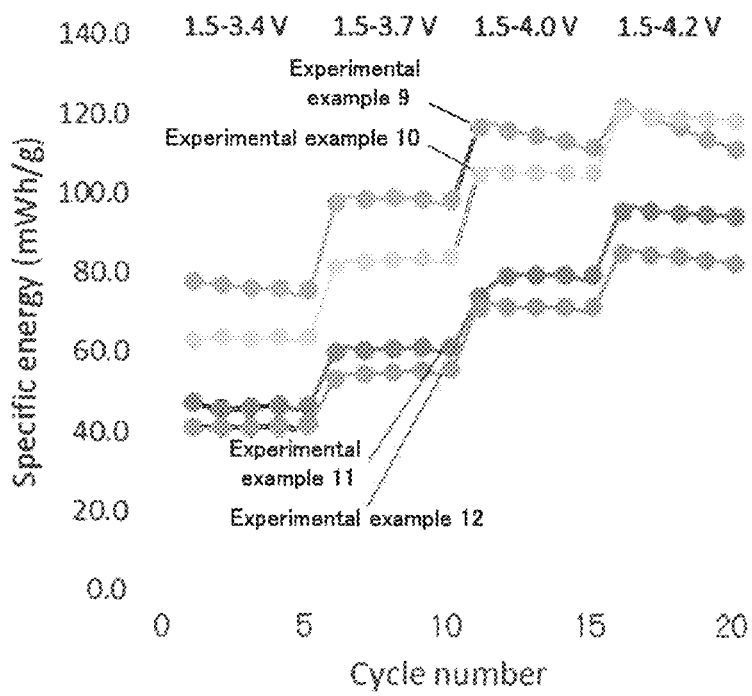
FIG. 9 is a graph illustrating the energy density under charge-discharge conditions of Experimental examples 9 to 12.

Table 1 lists the capacity ratio of electric capacity B (mAh) of the negative electrode to electric capacity A (mAh) of the positive electrode, i.e., B/A, in different charge-discharge voltage ranges. FIGS. 8 and 9 illustrate the energy densities under the charge-discharge conditions of Experimental examples 5 to 8 and Experimental examples 9 to 12. It was found that a capacity ratio B/A of 6 or more resulted in more stable cycle characteristics and that a capacity ratio B/A of 7 or more resulted in even more stable cycle characteristics. In the negative electrode containing lithium 2,6-naphthalenedicarboxylate, when lithium 2,6-naphthalenedicarboxylate was used in an amount of 4 mg/cm² or more, high energy densities of 40 to 90 Wh/kg per total weight of the positive and negative electrode active materials were stably obtained, which indicated that charge and discharge were satisfactorily performed. In the negative electrode containing lithium 4,4'-biphenyldicarboxylate, when lithium 4,4-biphenyldicarboxylate was used in an amount of 4 mg/cm² or more, high energy densities of 40 to 120 Wh/kg per total weight of the positive and negative electrode active materials were stably obtained, which indicated that charge and discharge were satisfactorily performed. This demonstrated that in the negative electrode containing the layered structure of the present invention, a larger capacity than an actually available capacity (about 70 mAh/g) of a graphite negative electrode used for a common lithium-ion capacitor was available. It was also found that because charge and discharge were performed at a voltage comparable to that in the case of using a graphite negative electrode, the energy density was further increased.

TABLE 1

| Kind of layered structure | Amount of layered structure mg/cm² | Ratio of negative electrode capacity against positive electrode capacity under charge-discharge voltage range | | | |
|---|---|---|---|---|---|
| | | 1.5-3.4 V | 1.5-3.7 V | 1.5-4.0 V | 1.5-4.2 V |
| Experimental example 5 | dilithium 2,6-naphthalenedicarboxylate | 2 | 6.1 | 5.2 | 4.3 | 3.5 |
| Experimental example 6 | | 4 | 12.2 | 10.3 | 8.6 | 7.1 |
| Experimental example 7 | | 6 | 18.2 | 15.5 | 12.9 | 10.6 |
| Experimental example 8 | | 8 | 24.3 | 20.7 | 17.2 | 14.1 |
| Experimental example 9 | dilithium 4,4'-biphenyldicarboxylate | 2 | 5.5 | 4.7 | 3.9 | 3.2 |
| Experimental example 10 | | 4 | 11.0 | 9.4 | 7.8 | 6.4 |
| Experimental example 11 | | 6 | 16.6 | 14.1 | 11.7 | 9.6 |
| Experimental example 12 | | 8 | 22.1 | 18.8 | 15.6 | 12.9 |

4. Study of Mixing Ratio in Negative Electrode Mixture

The mixing ratio of the layered structure in the negative electrode mixture was studied as reference examples.

Reference Example 1

(Production of Lithium 6-Naphthalenedicarboxylate Negative Electrode)

First, 73.9% by mass of lithium 2,6-naphthalenedicarboxylate prepared by the method described above, 13.0% by mass of carbon black (TB5500 (diameter: about 50 nm), Tokai Carbon Co., Ltd.) serving as a conductive granular carbon material, 5.2% by mass of carboxymethyl cellulose (CMC) (CMC Daicel 1120, Daicel FineChem Ltd.) serving as a water-soluble polymer, and 7.8% by mass of a styrene-butadiene copolymer (SBR) (BM-400B, Zeon Corporation) were mixed together. An appropriate amount of water serving as a dispersion media was added thereto. The mixture was subjected to dispersion to prepare a slurry-like mixture. The slurry-like mixture was uniformly applied to a copper foil current collector having a thickness of 10 μm and was dried by heating to form a coated sheet. Then the coated sheet was pressed and punched to provide a disk-like electrode having an area of 2.05 cm².

(Production of Two-Electrode Test Cell)

Lithium hexafluorophosphate was added to a nonaqueous solvent mixture of 30:40:30 (by volume) ethylene carbonate/dimethyl carbonate/ethyl methyl carbonate in such a manner that the concentration of lithium hexafluorophosphate was 1 mol/L, thereby preparing a nonaqueous electrolytic solution. The lithium 2,6-naphthalenedicarboxylate was used as a working electrode. Lithium metal foil (thickness: 300 μm) was used as a counter electrode. A separator (available from Toray Tonen Co., Ltd.) impregnated with the nonaqueous electrolytic solution was interposed between the electrodes to produce a two-electrode test cell.

(Charge-Discharge Test)

In an environment having a temperature of 20° C., the two-electrode test cell that had been produced was reduced (discharged) to 0.5 V at 0.14 mA and then oxidized (charged) to 2.0 V at 0.14 mA. At the first charge-discharge operation, the reduction capacity was denoted as Q(1st)red, and the oxidation capacity was denoted as Q(1st)oxi. At the 10th charge-discharge operation, the reduction capacity was denoted as Q(10th)red, and the oxidation capacity was denoted as Q(10th)oxi. The initial efficiency was calculated using the formula (Q(1st)oxi/Q(1st)red)×100. The capacity retention ratio after 1.0 cycles was calculated using the formula (Q(10th)oxi(1st)oxi)×100. The maximum oxidation capacity in the first to 10th charge-discharge operations was defined as the maximum capacity.

Reference Examples 2 to 12

Cells were produced as in Reference example 1, except that in the production of the coated electrodes, the negative electrodes had different compositions as listed in Table 2. The cells were subjected to the charge-discharge test. In Reference example 12, fibrous carbon (vapor-grown carbon fiber VGCF (diameter: about 150 nm, length: about 10 to 20 μm), available from Showa Denko K.K.) was used as a fibrous conductive material, poly(vinylidene fluoride) was used as a binder, and N-methyl-2-pyrrolidone was used as the dispersion media.

Results and Discussion

Figure 10:
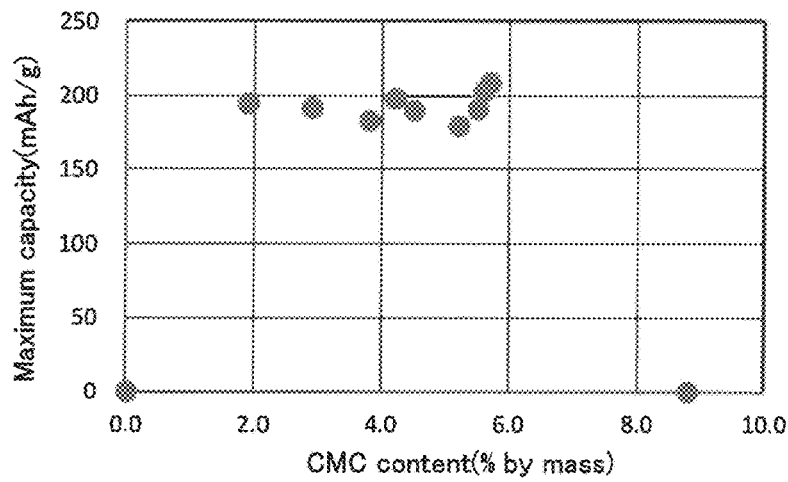
FIG. 10 is a graph illustrating the relationship between the CMC content and the maximum capacity.
Figure 11:
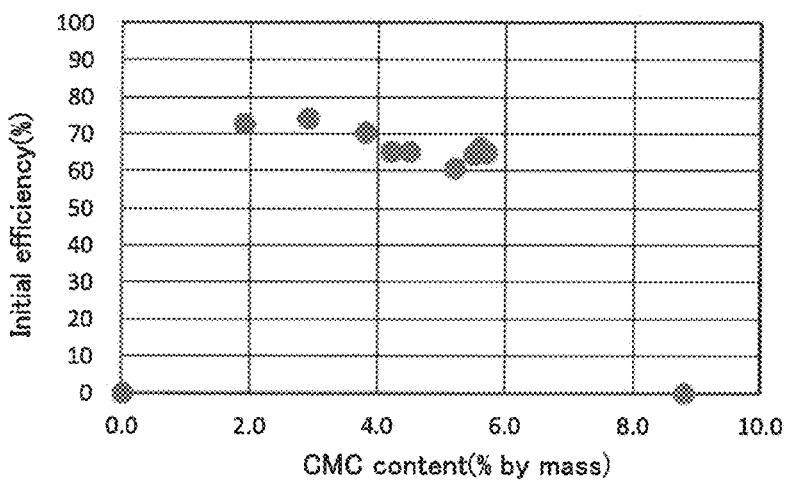
FIG. 11 is a graph illustrating the relationship between the CMC content and the initial efficiency.
Figure 12:
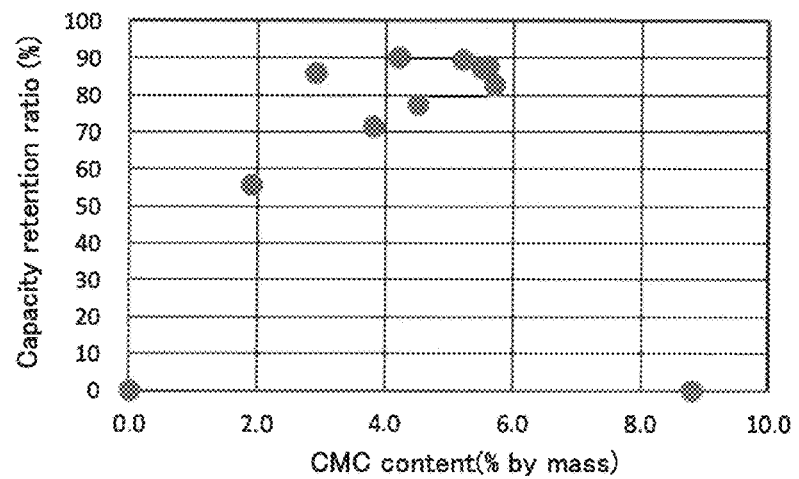
FIG. 12 is a graph illustrating the relationship between the CMC content and the capacity retention ratio.

Table 2 lists the results of the maximum capacities, the initial efficiencies, and the capacity retention ratios in Reference examples 1 to 12. FIGS. 10 to 12 are graphs illustrating the relationships between the CMC content and the maximum capacity, between the CMC content and the initial efficiency, and between the CMC content and the capacity retention ratio. As listed in Table 2, it was found that all of the maximum capacity, the initial efficiency, and the capacity retention ratio in each of Reference examples 1 to 8, in which the CMC-based binder was used in a proportion of 2% or more by mass and 8% or less by mass, were higher than those in Reference example 10, in which the CMC-based binder was not used, Reference example 11, in which an excessive amount of the CMC-based binder was used, and Reference example 12, in which the PVdF-based binder was used. With regard to this point, the cross sections of the electrodes were observed with a scanning electron microscope (SEM). In each of Reference examples 1 to 8, the entire electrode mixture was blackish, the active material, the conductive material, and the water-soluble polymer were uniformly mixed and tightly bonded to the current collector. In contrast, in Reference example 10, white portions and black portions were present in the electrode mixture, which indicated that the electrode mixture was phase-separated. In Reference examples 11 and 12, observations revealed that there were many portions where the electrode mixtures were not tightly bonded to the current collectors. These results seemingly indicated that the effect of uniformly mixing the active material with the conductive material and tightly bonding the mixture to the current collector in each of Reference examples 1 to 8, in which the CMC-based binder was used in appropriate amounts, was higher than those in Reference example 10, in which the CMC-based binder was not used, Reference example 11, in which an excessively amount of the CMC-based binder was used, and Reference example 12, in which the PVdF-based binder was used, thus inhibiting the occurrence of a heterogeneous reaction in the electrode to further improve the charge-discharge characteristics, FIGS. 10 and 11 indicated that a CMC content of the electrode of 8.0% or less by mass enabled the maximum capacity and the initial efficiency to be further increased. FIG. 12 indicated that a CMC content of the electrode of 2.0% or more by mass and 8.0% or less by mass enabled the capacity retention ratio to be further increased. In Reference example 9, in which the electrode had a CMC content of 1.9% by mass, although the maximum capacity and the initial efficiency were comparable to those in Reference examples 1 to 8, the capacity retention ratio was 10% or more lower than those in Reference examples 1 to 8. It was thus found that the use of the electrode containing 2% or more by mass and 8% or less by mass of the water-soluble polymer resulted in the improved capacity, initial efficiency, and capacity retention ratio.

TABLE 2

| | Composition of negative electrode | | | | | | Experimental result | | |
|---|---|---|---|---|---|---|---|---|---|
| | Active material % by mass | Granular carbon % by mass | Fibrous carbon % by mass | CMC % by mass | SBR % by mass | PVdF % by mass | Maximum capacity mAh/g | Initial efficiency % | Capacity retention ratio % |
| Reference example 1 | 73.9 | 13.0 | 0.0 | 5.2 | 7.8 | 0.0 | 179.7 | 60.9 | 89.7 |
| Reference example 2 | 77.7 | 13.7 | 0.0 | 5.5 | 3.2 | 0.0 | 190.9 | 64.5 | 87.3 |
| Reference example 3 | 78.7 | 13.9 | 0.0 | 5.6 | 1.9 | 0.0 | 203.6 | 66.4 | 88.0 |
| Reference example 4 | 79.8 | 14.1 | 0.0 | 4.2 | 1.9 | 0.0 | 198.2 | 65.3 | 90.3 |
| Reference example 5 | 80.2 | 14.2 | 0.0 | 5.7 | 0.0 | 0.0 | 208.9 | 65.0 | 82.9 |
| Reference example 6 | 81.0 | 14.3 | 0.0 | 2.9 | 1.9 | 0.0 | 191.8 | 74.3 | 86.1 |
| Reference example 7 | 81.8 | 11.2 | 0.0 | 4.5 | 2.6 | 0.0 | 190.2 | 65.3 | 77.6 |
| Reference example 8 | 84.7 | 9.4 | 0.0 | 3.8 | 2.2 | 0.0 | 183.2 | 70.5 | 71.6 |
| Reference example 9 | 87.1 | 9.7 | 0.0 | 1.9 | 1.3 | 0.0 | 194.8 | 72.8 | 55.9 |
| Reference example 10 | 83.3 | 14.7 | 0.0 | 0.0 | 2.0 | 0.0 | Unmeasurable | Unmeasurable | Unmeasurable |
| Reference example 11 | 74.9 | 13.2 | 0.0 | 8.8 | 3.0 | 0.0 | Unmeasurable | Unmeasurable | Unmeasurable |
| Reference example 12 | 66.7 | 11.1 | 11.1 | 0.0 | 0.0 | 11.1 | 134.7 | 51.2 | 41.7 |

5. Others

In the case of lithium 2,6-naphthalenedicarboxylate, the operating potential is 0.8 V versus lithium metal. In the case of lithium 4,4'-biphenyldicarboxylate, the operating potential is 0.7 V versus lithium metal. In lithium-ion capacitors including negative electrodes composed thereof, thus, the ultimate potentials of activated carbon positive electrodes are estimated at 5 V and 4.9 V. In contrast, in a lithium-ion capacitor containing graphite, the potential of an activated carbon positive electrode is 4 V versus Li metal. This presumably indicates the ultimate potential of an activated carbon positive electrode of a lithium-ion capacitor including a negative electrode with the layered structure of the present invention is higher than that of a lithium-ion capacitor including graphite:

Activated carbon positive electrodes are known to generate gas when the potential thereof is 4.2 V or more. Thus, the upper limit voltage of a lithium-ion capacitor cell depends on the restriction of the ultimate potential of an activated carbon positive electrode. It is believed that hydrogen gas, which is one of the gas components, is generated by a mechanism in which a decomposition product at a positive electrode diffuses on a negative electrode and undergoes reductive decomposition (for example, see Electrochem. Commun. 7. 925-930 (2005)). Here, the negative electrode including the layered structure of the present invention operates at a high potential, compared with a graphite negative electrode. It is thus believed that the diffusion of a component formed at the positive electrode and decomposition accompanied by gas generation are hindered, so that even if the operating potential of the activated carbon positive electrode is increased, the cell degradation can be inhibited.

6. Conclusion

As described above, it was found that in the lithium-ion capacitor including the negative electrode with the layered structure of the present invention, the cell degradation due to overdischarge can be more easily inhibited, and heat generation can also be inhibited. It was also found that when the positive electrode and the negative electrode are used in combination such that the capacity ratio of electric capacity B of the negative electrode to electric capacity A of the positive electrode, i.e., B/A, is 6 or more, a high energy density can be stably obtained, which is preferred. In the examples, the cases where lithium 2,6-naphthalenedicarboxylate and lithium 4,4'-biphenyldicarboxylate were used for the negative electrodes were specifically studied. Because the layered structure of the present invention is similar thereto in structural terms, the same effect is seemingly provided.

The present application claims priority from Japanese Patent Application No. 2015-136482, filed on Jul. 7, 2015, the entire contents of which are incorporated herein by reference.

INDUSTRIAL APPLICABILITY

The present invention can be used in battery industry.

REFERENCE SIGNS LIST

10 electricity storage device, 11 current collector, 12 positive electrode mixture, 13 positive electrode sheet, 14 current collector, 17 negative electrode mixture, 18 negative electrode sheet, 19 separator, 20 nonaqueous electrolyte solution, 22 cylindrical case, 24 positive electrode terminal, 26 negative electrode terminal

The invention claimed is:

1. An electricity storage device comprising:
a negative electrode having a layered structure comprising multiple organic backbone layers and multiple alkali metal element layers repeatedly, the organic backbone layers containing an aromatic compound having an aromatic ring structure without a carbonyl group, the aromatic compound being in the form of dicarboxylate anions, and the alkali metal element layers containing an alkali metal element coordinated with oxygen in the dicarboxylate anions to form a backbone;
a positive electrode that provides electric double-layer capacity; and
a nonaqueous electrolyte solution provided between the negative electrode and the positive electrode, the nonaqueous electrolyte solution containing an alkali metal salt,
wherein the aromatic compound includes one or more structures selected from the group consisting of structures represented by formulae (3) to (5):

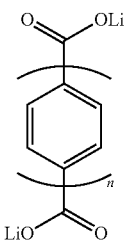
(3)

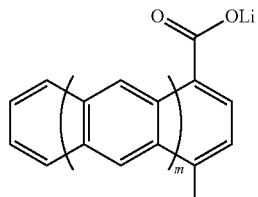
(4)

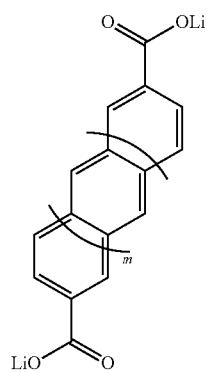
(5)

where n is an integer of 1 or more and 5 or less, m is an integer of 0 or more and 3 or less, and the aromatic compound has a substituent or a heteroatom in its structure, an area density of the layered structure is 4 mg/cm$^2$ or more and 8 mg/cm$^2$ or less, the layered structure includes lithium 2,6-naphthalenedicarboxylate, the positive electrode contains activated carbon having a specific surface area of 1,000 m$^2$/g or more, a capacity ratio (B/A) of electric capacity B (mAh) of the negative electrode to electric capacity A (mAh) of the positive electrode is 6 or more, the negative electrode includes a negative electrode mixture containing 2% or more by mass and 8% or less by mass of a water-soluble polymer that is at least one of carboxymethyl cellulose and poly(vinyl alcohol), and the negative electrode includes a negative electrode mixture containing 8% or less by mass of a styrene-butadiene copolymer.

2. The electricity storage device according to claim 1, wherein the layered structure is provided in layers by a π-electron interaction of the aromatic compound and has a monoclinic crystal structure belonging to space group P2$_1$/c.

3. The electricity storage device according to claim 1, wherein the layered structure has a structure in which the alkali metal element is tetracoordinated with four oxygen atoms of different dicarboxylate anions, the structure being represented by formula (1):

[Chem. 1]

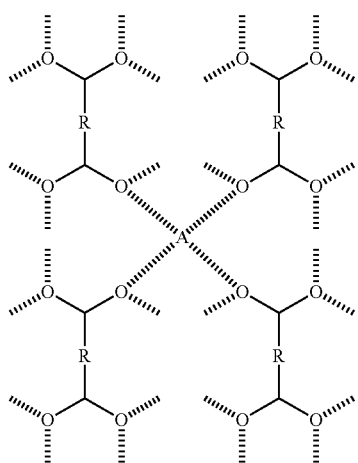

(1)

where each R represents a structure having one or more aromatic rings, two or more of R may be identical, one or more of R may be different, and A represents an alkali metal.

4. The electricity storage device according to claim 1, wherein the electricity storage device is formed by pre-doping the negative electrode with an alkali metal ion.

5. The electricity storage device according to claim 1, wherein the specific surface area of the activated carbon is 2,000 m$^2$/g or more.

6. The electricity storage device according to claim 1, wherein the negative electrode includes a negative electrode mixture containing 5% or more by mass and 15% or less by mass of a conductive material.

7. The electricity storage device according to claim 1, wherein, in the layered structure, each pair of adjacent organic backbone layers of the organic backbone layers are interposed with a respective alkali metal element layer of the alkali metal element layers disposed between the respective pair of adjacent organic backbone layers.

8. The electricity storage device according to claim 1, wherein the negative electrode having the layered structure consists of the multiple organic backbone layers and multiple alkali metal element layers repeatedly.

9. The electricity storage device according to claim 1, wherein a change in an internal resistance of the negative electrode including the layered structure including lithium 2,6-naphthalenedicarboxylate at a normalized capacity in a range of 0 to −0.1 is higher than a change in an internal resistance of a graphite negative electrode at a normalized capacity in a range of 0 to −0.1.

10. The electricity storage device according to claim 1, wherein a calorific value of the electricity storage device comprising the negative electrode including the layered structure including lithium 2,6-naphthalenedicarboxylate is smaller than a calorific value of a electricity storage device including a graphite negative electrode.

11. The electricity storage device according to claim 10, wherein the calorific value of the electricity storage device comprising the negative electrode including the layered structure including lithium 2,6-naphthalenedicarboxylate is less than 50% of the calorific value of the electricity storage device including a graphite negative electrode.

12. The electricity storage device according to claim 1, wherein a capacity the electricity storage device comprising the negative electrode including the layered structure including lithium 2,6-naphthalenedicarboxylate is higher than a capacity of a electricity storage device including a graphite negative electrode.

* * * * *